Oct. 6, 1959 C. W. WOODS 2,907,040

TOOLS

Filed Oct. 22, 1956 3 Sheets-Sheet 1

INVENTOR.
CHARLES W. WOODS
BY Carl H. Lymnestvedt
AGENT

TOOLS

Filed Oct. 22, 1956 3 Sheets-Sheet 2

INVENTOR.
CHARLES W. WOODS
BY
Carl H. Symmestvedt
AGENT

Oct. 6, 1959 C. W. WOODS 2,907,040

TOOLS

Filed Oct. 22, 1956 3 Sheets-Sheet 3

INVENTOR.
CHARLES W. WOODS
BY
Carl H. Synnestvedt
AGENT

1

2,907,040

TOOLS

Charles W. Woods, Langhorne Manor, Pa., assignor to Philco Corporation, Philadelphia, Pa., a corporation of Pennsylvania Application October 22, 1956, Serial No. 617,430

7 Claims. (Cl. 1—210)

This invention relates to apparatus for the fabrication of electrical circuit panels and the like. In particular it has to do with the insertion of components in such panels and their securement by the clinching of lead wires. The invention is an improvement over that disclosed by Walter Stuhre in application Serial No. 523,188, filed on July 20, 1955, under the title "Printed Wiring Panel and Method of Securing Components Thereto"; particularly, an improvement over Figures 11 and 12 of said application.

Insertion of disc capacitors will be described in particular; however it is a feature and object of the invention to provide apparatus which readily inserts various components of different design and size.

It is a further object to provide a practically universal tool, which is able to crimp the lead wires of various inserted components in any desired directions, either in line with one another or laterally bent at various angularities. This feature facilitates the insertion and subsequent soldering work on circuit panels having complex patterns of "printed" or "etched" conductors.

Still another object hereof is to provide automatic devices adapted to engage lead wire terminals extending through small holes in a panel, to bend such wire terminals into directions substantially parallel to the panel and to the proper printed conductors, adjacent these holes, and to provide said wire terminals additionally with end portions bent into predetermined forms in suitably oriented planes approximately normal to the panel. Thus the universal wire crimping device of the invention provides wire terminals of special three dimensional forms, with special orientations of the various components of said forms.

The invention has still other objects and features; for instance it provides a device which allows ready interchange of working parts, for the insertion of different types and sizes of components; it insures high accuracy with respect to the relative positioning of wire terminals and panel conductors; it avoids injury to any of these parts; it is capable of operation at a high speed; and it allows the use of panel, component and lead wire materials which may be considerably less than perfect for smooth mechanical handling, in view of their particular, electrical and other requirements.

These objects and requirements have been achieved by providing an automatic lead wire crimping device which may be compared with a miniature hand, having one type of finger means whereby it properly positions itself relative to the panel to be worked upon, and having another type of finger means, with movable finger tips, adapted to receive inserted lead wire terminals, to hold them against certain displacements, and to subject them to other predetermined displacements, for the purposes of insertion and securement. A more specific description of the device, of the associated control parts and of their operations will now be given, in conjunction with the drawing appended hereto, wherein—

Figure 1 is a perspective view of an insertion machine

2 equipped with a crimping tool in accordance with the present invention. Figure 2 is a detail view of the tool, on a larger scale, this view being taken along line 2—2 in Figure 1.

Figure 3 is a vertical section through the tool of Figure 2, on the scale of that figure, this view being taken along line 3—3 in Figure 2. Figure 4 is an exploded, perspective view of principal, lower, motion controlling or wrist parts of the mechanism of Figure 3, on a scale intermediate those of Figures 1 and 3. Figure 5 is a perspective view, on the scale of Figure 4, of an upper portion of the mechanism of Figure 3, providing the aforementioned mechanical hand.

Figures 6 and 7 are on a scale larger than that of Figures 2 and 3 and provide, respectively, plan and elevational views, the latter being partly in section, showing one orientation and position of the mechanized fingers of said hand of Figure 5. Figures 8 and 9 are respectively similar views which however show a different orientation and position of such fingers; and Figure 9 shows a slightly modified finger tip construction.

Figure 1:
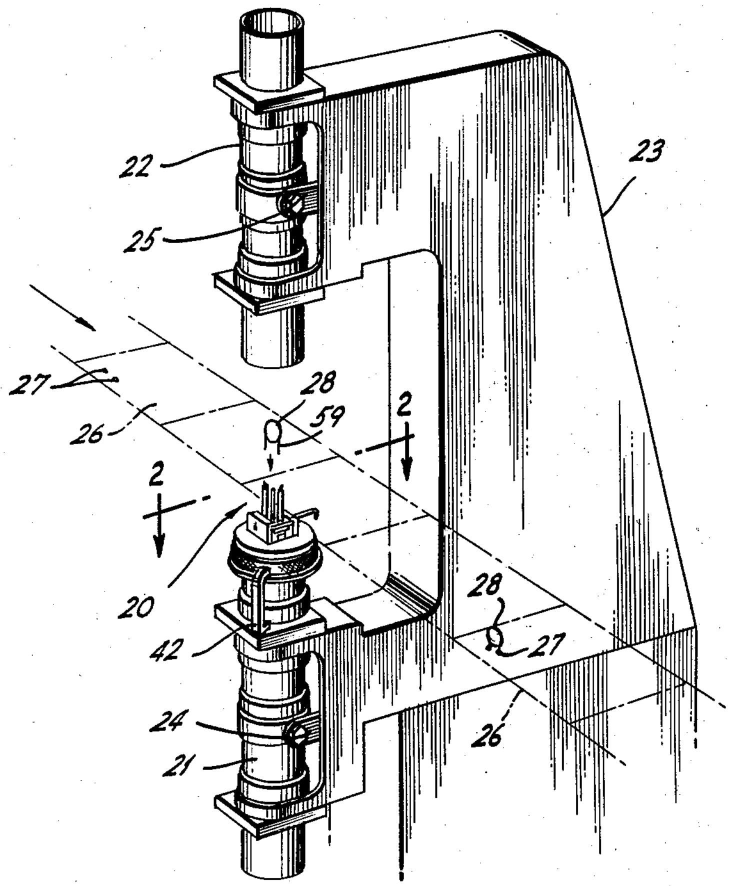

Referring first to Figure 1: the new crimping device 20 is shown as forming part of a lower ram mechanism 21, cooperating with an upper ram mechanism 22 in an insertion head 23.

The upper ram of course will normally be provided with some suitable component feeding and inserting mechanism, not shown; and both rams are vertically reciprocated toward and then away from a centrally located workpiece, by means of levers 24, 25 which are actuated within the head 23 by mechanical, electrical, hydraulic or other means and under the control of cycle supervision means, not shown. Those devices may for instance be of the type disclosed in the application Serial No. 559,335 which the undersigned has filed jointly with John G. Lord on January 16, 1956, under the title "Insertion Machine"; said application being assigned to the assignee of the present invention. This Lord-Woods application may also be consulted with respect to the mechanical details whereby an insertion head 23 receives a suitably oriented and intermittently progressing stream of panels 26, which as shown have preformed holes 27 for the insertion of components 28 by the combined upper and lower ram mechanisms 21, 22.

Figure 2:
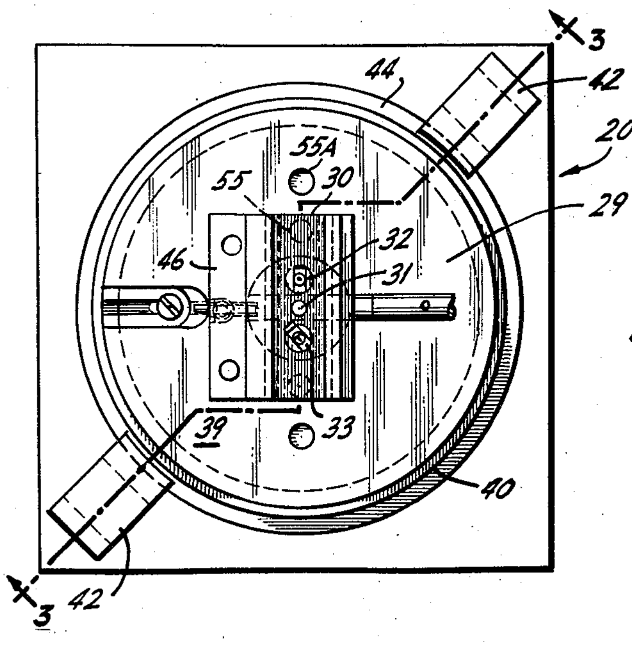
Figures 3, 4, 5:
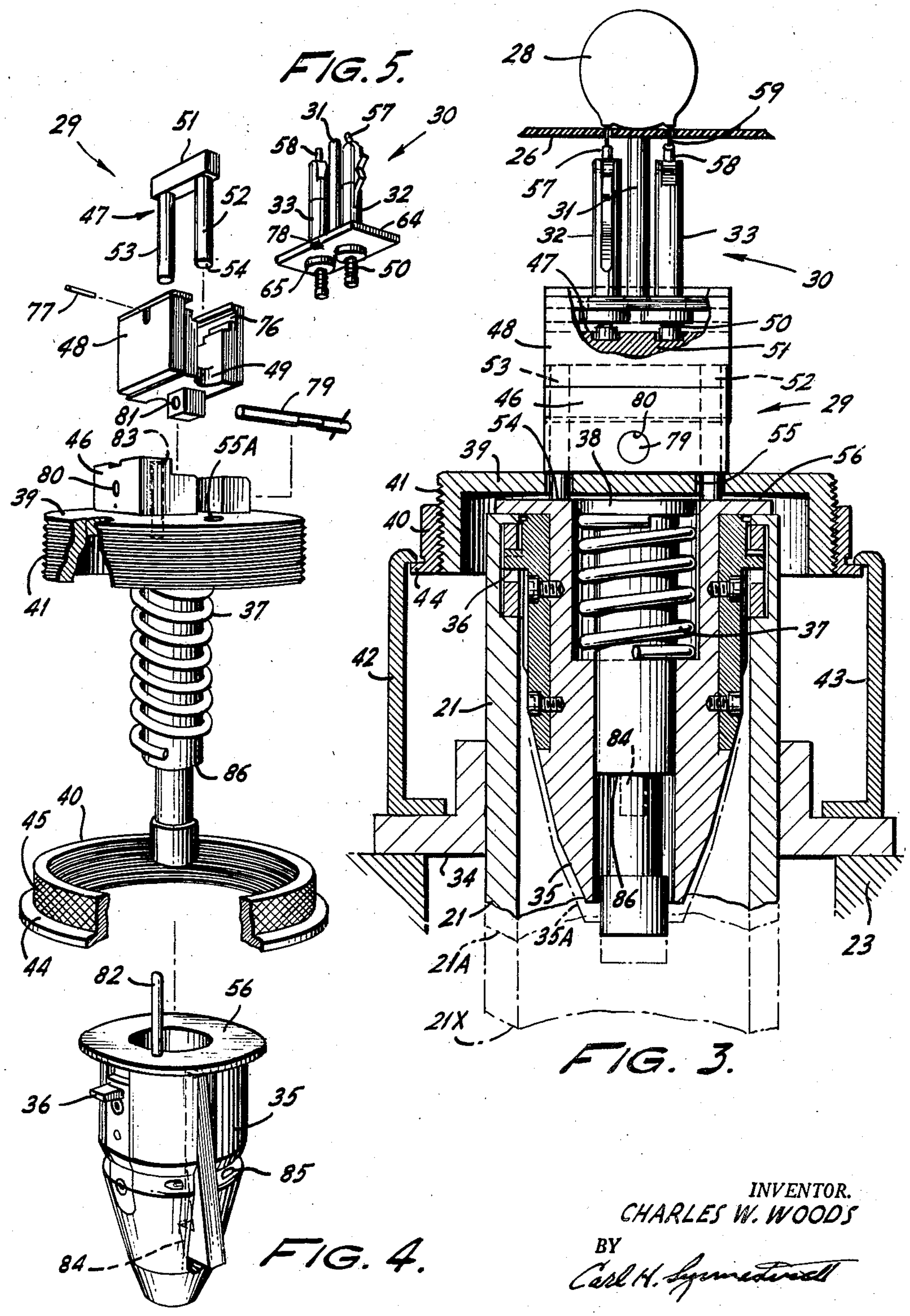

As shown in Figure 2, the mechanism 20 has a lower, tool-supporting and motion controlling part 29; the details of this are best shown in Figures 3 and 4. The mechanism further has an upper operative wire crimping part 30, best shown in Figure 5. As illustrated this part comprises a central, spacing finger 31 and a pair of slightly shorter crimping fingers 32, 33, one on each side of the spacing finger; however, in the broader aspect of the invention, either fewer or more or differently arranged fingers of each type can be provided.

The basic cooperation between the present mechanism 20 and a panel 26 and component 28 will be understood most readily upon a consideration of Figure 3, wherein the mechanism is shown at the end of an upward, wire clinching stroke of the ram 21. Throughout this stroke, which begins in a position such as 21X, the panel 26 is held in the position as shown, while the ram 21 travels upwardly through a suitable guide 34 which forms a stationary part of the machine 23. The ram 21 engages and raises a plug or wrist element 35, forming part of the supporting and motion controlling subcombination 29 of the crimping tool 20; this element is connected with the ram 21, for instance, by means comprising a key mechanism 36 (also see Figure 4). The element 35 in turn raises, indirectly (by resilient spring means 37 disposed therein, see Figure 3), a shouldered element 38 on the lower side of a plate 39 forming part of the tool support 29; the spring 37 being strong enough to support the weight of this plate, and of the parts mounted thereon, without appreciable compression of the spring. When the plate 39 has been moved upwardly to the exact point where the spacing finger 31 contacts the underside of the properly held panel 26, as shown, but where the wrist element 35 and ram 21 are only at positions 35A, 21A adjacent their upper limits, the upward stroke of the tool support plate 39 is stopped by means of a shouldered ring 40, suitably secured to this plate as at 41. For the purpose of so arresting the plate 39 and ring 40, stationary stop means 42, 43 are provided (see also Figure 1). Desirably, as shown in Figures 3, 4, 10, 11 and 12, the stop ring 40 is vertically adjustable relative to the plate 39 by a screw-threaded arrangement of the connecting means 41; and the stationary stop means 42, 43 engage an annular shoulder 44 on this ring. The ring has a knurled outer surface 45.

While the stop mechanism 42, 43, 44, as shown in Figure 3, prevents further rising of the tool support mechanism 29, including the plate 39 and also including a housing 46 thereon, it does not interfere with a slight additional rising of the ram and plug from positions 21A, 35A to positions 21, 35 against the pressure of the spring 37, the upper end of which is now restrained by the parts 34, 42, 43, 44, 40, 41, 39 and 38. The continued rising of the wrist element 35, relative to the now stationary support mechanism 29 and housing 46, now causes a small upward stroke of a motion transfer member 47. This member, separately shown in Figure 4, is guided by and partly contained in an adapter 48 which is rigidly mounted in or on the housing 46. The member 47 is normally biased toward the bottom 49 of this adapter, by spring means 50 forming part of the crimping fingers 32, 33, Figure 5. As best shown in Figure 3, these spring means 50 bear against an upper horizontal bar element 51 of the motion transfer member 47, which bar element has depending guide posts 52, 53 (Figure 4) secured to the underside thereof; and the lower ends 54 of these guide posts (Figures 3 and 4) extend freely through the adapter 48 and housing 46 and through openings 55 in the support plate 39, where-below these lower ends 54 rest on the top surface 56 of the wrist element 35. Therefore, as this element continues to rise, after the stopping of the support 29, there occurs a corresponding rise of the member 47, upwardly through the housing 46 and adapter 48, compressing the spring means 50 of the finger mechanism. This in turn causes tilting movements of finger tips 57, 58, for the purpose of crimping the lead wires 59 of the component 28.

Figure 6:
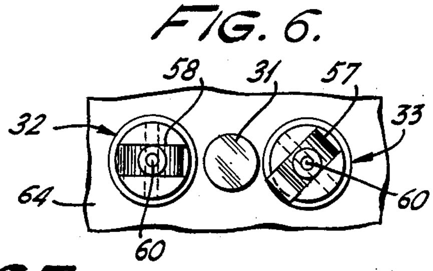
Figure 7:
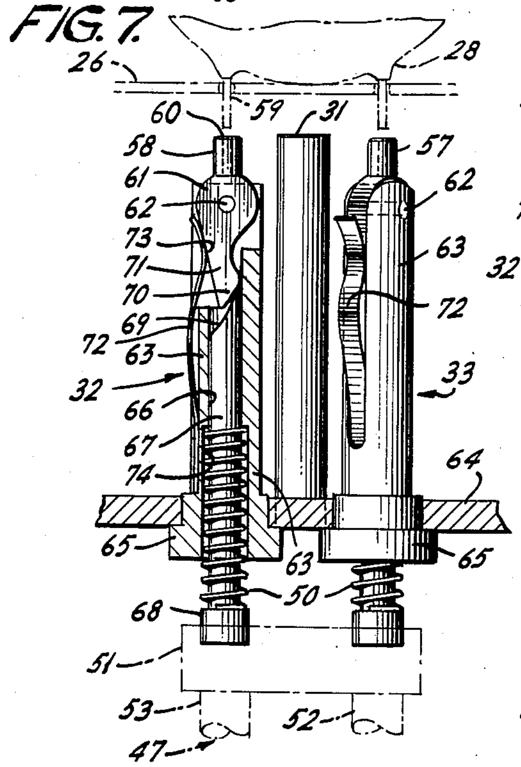

This tilting will now be described with reference to Figures 6 and 7. As best shown on the left side of Figure 7, where a finger 32 is shown in vertical cross section, the tip member 58 has a central recessed portion 60 forming an element for slidably receiving and holding the lead wire 59; this element being shown, in the present illustration, as a plain hollow cylinder and being rigidly secured to a lower pivot portion 61 of the tip member. This latter portion is pivoted on a small horizontal pivot pin 62 secured to and extending across an upper, slotted end of a rigid, tubular finger member 63. This finger member is press-fitted into a support plate 64, by a suitably shouldered, lower end portion 65 of the finger member. Coaxially through each finger member there extends a bore hole 66 which has sliding fit with a pin 67, the lower end 68 of which is in contact with the aforementioned upper bar 51 of the motion transfer member 47. The upper end of each pin 67 has a cam surface 69, cooperating with a cam surface 70 on a cam portion 71 of the tip member 58 so that raising of the pin 67 causes members 71, 58 to rock about the pivot 61, 62. Thus it will be seen that the slotted ends of members 63 form guide means for guiding motions of the respective tips 57, 58 in arcuate directions. Each of said guide means in turn is supported by the body of the respective tubular finger 63.

Reverse tilting of the tip member 58, upon downward withdrawal of the pin 67, is obtained by a spring 72 secured to member 63 and engaging a surface 73 of the cam 71, whereas downward withdrawal of the pin 67, together with similar withdrawal of the motion transfer member 47, is effected by the aforementioned spring 50, which surrounds a lower part of the pin 67 between the lower end member 68 of this pin and the upper end of a recess 74 in the tubular member 63.

Figure 8:
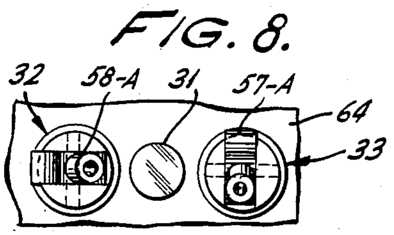

By means of the mounting and guiding means 61, 62, 63, 65, 69, 70, vertical motion of the pin 67 can be converted into tilting motion of the wire receiver tips 57, 58 in any desired vertical plane or orientation. Two such orientations are shown in Figure 6. The starting positions of the tips 57, 58 are desirably such that their recesses 60 are vertical, so that they readily receive the vertically inserted lead wires; and the suitably oriented tilting of these tips (best shown in Figures 8 and 9) leaves the inserted wires or leads in the form of three-dimensionally distorted bodies, as will be more fully explained hereinafter.

Figures 9, 13:
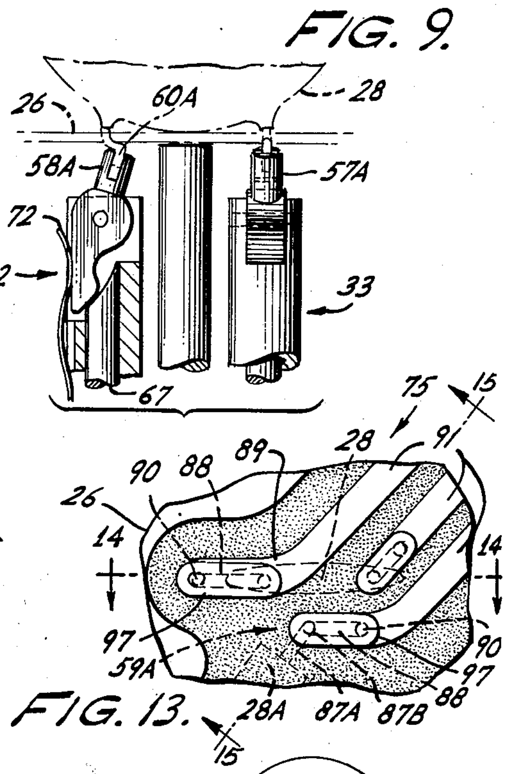
Figure 13 is a fragmentary face view, on the scale of Figures 6 to 9, of a printed circuit panel whereon components have been inserted and fastened by means including the present apparatus.

Figure 9 shows a tip member 58A with a slot 60A, for engagement of a lead having square or rectangular cross section.

The force of spring 72 is limited so that tip 58 or 58A, upon removal of the pin 67, does not immediately or forcibly return the wire receptacle and deform the wire; rather, the end of the wire or lead, inserted in the tip, holds the tip in tilted position, against the force of spring 72. Ultimately however the tip, together with the entire finger mechanism 31, 32, 33, is vertically withdrawn by a downward stroke of ram 21, key 36, and wrist element 35, gravitationally followed by plate 39, housing 46 and adapter 48 (Figure 3). The tilted position of the wire and tip (Figure 9) is slightly modified incident to this downward stroke; however, no appreciable permanent deformation is usually applied to the horizontal, panel clinching wire portion, at this time.

Adjustments of position and interchanges of parts are freely and flexibly allowed by the structure which has been described. Small, uniform tool members of the type shown in Figure 5 can be adapted to suit a practically endless variety of conductor patterns 75 (Figure 13), by the mere expedient of suitably turning the shoulders of the press-fitting members 65 (Figure 7). Lead terminals of different cross-section, such as wires or strips, can be accommodated by tip members 57, 58, 57A, 58A of different shape, some of which are indicated in Figures 6 to 9. Components 28 having different distances between their lead wires 59 (Figure 7) can be accommodated by simply installing standard finger members 31, 32, 33 on plain flat plates 64 of different size and with mounting holes at different distances from one another. Various different types of such a plate can readily be accommodated by the adapter 48 (Figure 4), wherein such a plate 64 will slidably be inserted in a slot 76, whereafter the plate will be centered by a pin 77 engaging a suitable notch 78 in the plate 64 (Figure 5). Also, as shown in Figure 2, the support plate 39 has more than one set of holes 55, 55A, for guide pins of smaller or larger motion transfer members 47. The required engagement between housing 46 and different adapters 48 is insured by a pin engagement mechanism 79, 80, 81, Figures 3 and 4.

Figure 12:
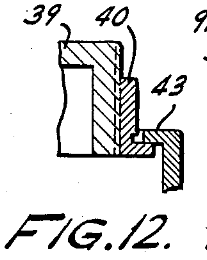

A precise adjustment of the vertical tool stroke, as mentioned, is readily achieved, by rotating the shouldered ring 40. This is best done in a lower position of the support member 39 (Figure 10); member 39 will then rise either to a correspondingly low position (Figure 11) or to a relatively higher position (Figure 12).

Still other adjustments may be provided, for instance in order to predetermine the orientation of the system of fingers 31, 32, 33 relative to the stream of panels 26 (Figures 1 and 2). For this purpose the machine as shown provides rigid engagement between key 36 and ram 21 (Figures 3 and 4), and slidable engagement between a vertical pin 82, secured to the top of the element 35, and one of several apertures 83 vertically extending through the plate 39 at predetermined angular distances from one another. For reorientation of the finger mechanism relative to the ram and wrist, it is preferred to provide a key member 84 pivotally secured to the plug 35 as at 85 to provide readily releasable engagement of a shoulder member 86 rigidly secured to the underside of the support plate 39.

The operation of the new mechanism has already been described to a large extent, hereinabove, but may be briefly summarized as follows.

Initially, when the mechanism of Figure 3 is in its lowermost position 21X, a panel 26 is transferred into the machine 23 (Figure 1); and strokes of the lower and upper rams 21, 22 are then initiated to bring the central or spacing finger to the underside of the panel, and to insert the lead wires of a component 28 in the mounting holes 27 of the panel. Ram 21 is then in position 21A.

Next follows the final portion of the upward stroke of the lower ram 21, during which the support and housing members 29, 46 are locked by mechanism 42, 44 against further upward movement, while the plug surface 56, motion transfer posts 52, 53, bar 51 and pin members 68, 67 (Figures 7, 9) move upwardly and tilt the crimping tips 57, 58, etc.

Figure 15:
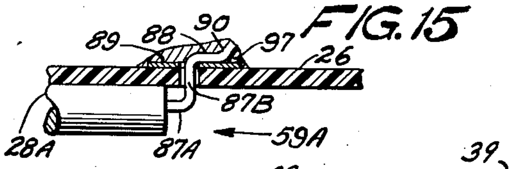
Figure 15 is a section taken along line 15—15 in Figure 13.
Figure 14:
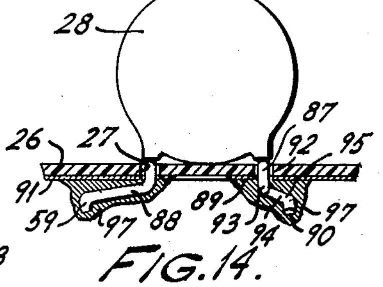
Figure 14 is a section taken along line 14—14 in Figure 13.
Figure 10:
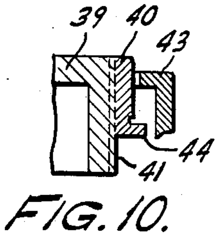
Figures 10, 11 and 12 are fragmentary detail views, on the scale of Figure 3; they show three different positions of a portion of a motion control mechanism which forms part of Figure 3.
Figure 11:
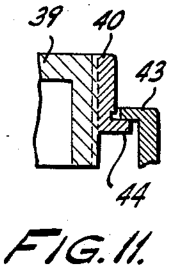

Thereafter a downward return stroke of the lower ram 21 is performed, wherein the tilted crimping tips are first loosened by disengagement of cam surfaces 69, 70 and then downwardly withdrawn, leaving the lead wires in specially bent forms, as indicated by Figures 13 and 15.

As a result of such bending such a wire has an upper, undistorted portion 87 extending from the component 28 to the adjacent side of the panel 26 and through the insertion hole 27; an intermediate portion 88, bent by the tilting of the tip 57 or 58 and extending along the printed side of the panel and one of the printed terminals 89 thereon; and a lower portion 90 held against said bending in recess 60 and depending from the end of the intermediate portion 88 and away from the surface of the panel.

In some cases additional bending is involved between the component and the panel, as for instance where a wire 59A is arranged axially of the component and bent to form a transition between an upper portion 87A parallel to the panel (appearing below the panel in the view of Figure 15) and a next following portion 87B passing through the insertion hole in the panel; in this latter case the form of the lead wire is likely to be three-dimensional, it being possible to arrange the portions 87A, 87B in one vertical plane and to arrange the portions 88, 90 in any other vertical plane, such planes intersecting along wire portion 87B. Also in this last mentioned case the crimped wire has three bends formed therein, one between portions 87A, 87B, a second between portions 87B, 88 and the third between portions 88, 90. At least these latter two corners or bends are incorporated in lead wires also if the component is of the radial lead or disc capacitor type.

Because of the preferred, compact arrangement of the printed terminals 89 and their interconnecting conductor strips 91, the length of the intermediate, component clinching wire portions 88 is desirably made quite small. Nevertheless, positive engagement between the wire and the panel can be obtained by the bending operation of the present tool, particularly when the shape of the cam surfaces 69, 70, 73 (Figure 7) is suitably selected and when the geometry of the finger mechanism 31, 32, 33 is proper in other respects, such as the vertical spacing between and the configuration of the upper ends of the fingers. It may be noted that the mechanical holding of the inserted component, prior to soldering, is largely performed by the engagement between the lead wire and the panel portions adjacent the corner 92 around which a wire portion 93, between portions 87, 88 (or 87B, 88) has been bent; the remaining length 94 of the wire portion 88, adjacent the terminal 89, is provided mainly to provide more extensive solder adhesion area, in the subsequent soldering of the panel.

In this latter connection the additional bend 95 at the end of the portion 88, forming the depending, terminal wire portion 90, is significant. When the panel, with the wire in place, is dipped in a bath of molten solder, it is an important function of this depending wire portion 90 to positively pierce the surface of the solder, breaking the surface tension of this material and thereby insuring safe and rapid solder wetting of the entire exposed series of wire portions 90, 95, 94, 93. This results in the formation of a sound and solid solder spot 97 and consequent successful completion of the panel fabrication.

While only a single embodiment of the universal crimper and two crimping tips have been described, it should be understood that the details thereof are not to be construed as limitative of the invention, except insofar as set forth in the following claims.

I claim:

1. In apparatus for connecting electrical components with a circuit panel by component leads: holder means for independently holding and moving portions of such leads inserted through the panel; actuator means for simultaneously moving such holder means; and guide means for independently guiding the motion of each so moving holder means and of the portion of the lead held thereby in a direction at least comprising a component parallel to the panel, whereby such leads can be bent into a three-dimensional form comprising lead portions extending first through the panel, then in a direction which at least includes a component extending along the panel and then away from the panel.

2. Apparatus as described in claim 1, additionally comprising elongated support means for each holder means, said support means extending in directions normal to the circuit panel; a part of the actuator means being movable along each support means, for moving the corresponding holder means.

3. Apparatus as described in claim 2, comprising a mounting plate for the support means, parallel to the panel, each support means being fitted into the mounting plate in an orientation independent from that of other such support means.

4. In apparatus for mechanically securing two-lead components to an electrical circuit panel and preparing for solder connection thereof: a pair of holders, each for slidably holding the end of one component lead inserted through the panel; actuator means for producing simultaneous movements of such holders, with the lead ends slidably held thereby, in directions approximately parallel to the panel; and guide means for guiding each holder and the lead slidably held thereby along a line, in one of said directions, which line is independent of those in which another such holder and the lead slidably held thereby is guided.

5. Apparatus as described in claim 4, wherein said guide means comprises individual mounting means for each of said pair of holders; each holder being a tubular member extending in a direction normal to the circuit panel, adjustably fitted into the mounting means and having part of the actuator means extending and movable along the tubular holder.

6. Apparatus as described in claim 5 additionally comprising a member forming part of the actuator means and movable relative to the mounting means to effect said simultaneous movements; housing and adapter means for rigidly holding said mounting means and for slidably guiding the last mentioned member; and means for first moving said housing and adapter means toward the circuit panel, then stopping it at a point spaced from the circuit panel, then moving the last mentioned member through the housing and adapter means for said simultaneous moving of the holders, and then reversing said movements.

7. Apparatus as described in claim 5 wherein the actuator means includes a pair of members resiliently connected with one another, both members being adapted to move from a point remote from the panel in directions normal to the panel, into and then reversely away from a position wherein said holder means are closer to but still spaced from the panel; one of the members of the pair being adapted to stop in said position and the other member of the pair being adapted to move beyond said position; and means for effecting, in response to said moving beyond said position, said moving of the holder means in directions approximately parallel to the panel.

References Cited in the file of this patent

UNITED STATES PATENTS

| | | |
|---|---|---|
| 397,267 | Ashworth | Feb. 5, 1889 |
| 532,776 | Geisenhoner | Jan. 22, 1895 |
| 1,238,959 | Tomlinson | Sept. 4, 1917 |
| 1,451,169 | Maranville | Apr. 10, 1923 |
| 1,495,193 | Maranville | May 27, 1924 |
| 2,346,209 | De Wald | Apr. 11, 1944 |
| 2,746,041 | Heeley | May 22, 1956 |
| 2,758,303 | Dow | Aug. 14, 1956 |